(12) United States Patent
Zheng et al.

(10) Patent No.: US 11,014,348 B2
(45) Date of Patent: May 25, 2021

(54) METHOD FOR BONDING A THREE-DIMENSIONAL COVER AND A GLUED OPTICAL ASSEMBLY

(71) Applicants: BOE TECHNOLOGY GROUP CO., LTD., Beijing (CN); Chengdu BOE Optoelectronics Technology Co., Ltd., Sichuan (CN)

(72) Inventors: Changpin Zheng, Beijing (CN); Sehyuck Park, Beijing (CN); Tao Wang, Beijing (CN); Zhouping Wang, Beijing (CN); Li Deng, Beijing (CN); Shaokun Yuan, Beijing (CN)

(73) Assignees: BOE TECHNOLOGY GROUP CO., LTD., Beijing (CN); CHENGDUE BOE OPTOELECTRONICS TECHNOLOGY CO., LTD, Sichuan (CN)

( * ) Notice: Subject to any disclaimer, the term of this patent is extended or adjusted under 35 U.S.C. 154(b) by 342 days.

(21) Appl. No.: 15/993,929

(22) Filed: May 31, 2018

(65) Prior Publication Data
US 2019/0039365 A1   Feb. 7, 2019

(30) Foreign Application Priority Data
Aug. 3, 2017 (CN) .......................... 201710657414.5

(51) Int. Cl.
*B32B 38/18* (2006.01)
*B32B 37/12* (2006.01)
(Continued)

(52) U.S. Cl.
CPC ...... *B32B 37/1284* (2013.01); *B32B 38/1866* (2013.01); *G06F 1/1607* (2013.01);
(Continued)

(58) Field of Classification Search
USPC .......................................... 156/247, 249, 289
See application file for complete search history.

(56) References Cited

U.S. PATENT DOCUMENTS 6,485,596 B1 * 11/2002 Toyoda ................. B29C 31/006
156/230
9,498,938 B2 * 11/2016 Son ....................... B32B 38/1866
(Continued)

FOREIGN PATENT DOCUMENTS

CN       102119077       7/2011
CN       104449432 A *  3/2015  ................ C09J 7/00
(Continued)

OTHER PUBLICATIONS

English Abstract of CN 104449432A (Year: 2020).*
Office action from Chinese Application No. 2017106574145 dated Sep. 30, 2018.

*Primary Examiner* — Mark A Osele
(74) *Attorney, Agent, or Firm* — Calfee, Halter & Griswold LLP

(57) ABSTRACT

A method for bonding a three-dimensional cover, which includes the following steps: bonding a flexible display panel on a heavy release film through optical adhesive to obtain a bonded body; placing the bonded body on a carrying surface of a conformable tool, making the flexible display panel face the carrying surface of the conformable tool, and fixing two ends of the heavy release film in the bonded body to fixtures of the conformable tool; controlling the fixtures of the conformable tool to adjust the shape of the bonded body, so that the adjusted shape of the bonded body matches the three-dimensional cover; tearing off the heavy release film from the bonded body to obtain the flexible display panel with optical adhesive, and bonding the three-dimensional cover to the flexible display panel using the optical adhesive.

12 Claims, 8 Drawing Sheets

(51) Int. Cl.
*B32B 38/10* (2006.01)
*G06F 1/16* (2006.01)
*G09F 9/30* (2006.01)

(52) U.S. Cl.
CPC ........ *G06F 1/1652* (2013.01); *B32B 2457/20* (2013.01); *G02F 2202/28* (2013.01); *G09F 9/301* (2013.01)

(56) References Cited

U.S. PATENT DOCUMENTS

| | | | | |
|---|---|---|---|---|
| 9,796,169 | B2* | 10/2017 | Kim | B32B 37/1292 |
| 10,105,943 | B2* | 10/2018 | Kim | B32B 38/1841 |
| 10,399,321 | B2* | 9/2019 | Lee | B32B 3/04 |
| 10,500,820 | B2* | 12/2019 | Lee | B32B 38/10 |
| 10,518,515 | B2* | 12/2019 | Choi | H01L 27/1262 |
| 10,843,449 | B2* | 11/2020 | Johnson | B32B 38/1858 |
| 2011/0120619 | A1 | 5/2011 | Harada et al. | |
| 2017/0199547 | A1 | 7/2017 | Jeong | |
| 2018/0022013 | A1* | 1/2018 | Choi | B29C 53/36 156/196 |
| 2019/0329540 | A1* | 10/2019 | Kim | B32B 7/12 |
| 2020/0393872 | A1* | 12/2020 | Lim | G06F 1/1656 |

FOREIGN PATENT DOCUMENTS

| | | |
|---|---|---|
| CN | 204310999 | 5/2015 |
| CN | 106960634 | 7/2017 |

* cited by examiner

METHOD FOR BONDING A THREE-DIMENSIONAL COVER AND A GLUED OPTICAL ASSEMBLY

RELATED APPLICATION

This application claims the priority of Chinese patent application No. 201710657414.5 filed on Aug. 3, 2017, the entire content of which is hereby incorporated by reference.

FIELD OF THE DISCLOSURE

The disclosure relates to the technical field of displays, in particular to a method for bonding a three-dimensional cover and a glued optical assembly.

BACKGROUND OF THE DISCLOSURE

With the development of display technology and the popularization of smart devices, people's requirements for display panels are getting higher and higher. Among them, flexible display panels have attracted more and more attention because of their low power consumption and flexible characteristics. In transportation and usage, generally, a three-dimensional cover for protecting the flexible display panel is bonded to the flexible display panel.

At present, the method for bonding the three-dimensional cover to the flexible display panel usually includes the following steps: providing the three-dimensional cover; bending the shape of the flexible display panel into a shape similar to the contour shape of the inner surface of the three-dimensional cover; bonding the three-dimensional cover to the flexible display panel by directly pouring liquid adhesive between the three-dimensional cover and the flexible display panel. This bonding method of directly pouring liquid adhesive not only has low bonding efficiency, but also easily damages the flexible display screen and leads to poor display.

SUMMARY OF THE DISCLOSURE

In view of this, the present disclosure provides a method for bonding a three-dimensional cover and a glued optical assembly.

In a first embodiment, there is provided a method for bonding a three-dimensional cover, the method comprising:

bonding a flexible display panel on a heavy release film by optical adhesive to obtain a bonded body;

placing the bonded body on a carrying surface of a conformable tool, making the flexible display panel face the carrying surface of the conformable tool, and fixing two ends of the heavy release film in the bonded body to fixtures of the conformable tool;

controlling the fixtures of the conformable tool to adjust the shape of the bonded body so that the adjusted shape of the bonded body matches the shape of the three-dimensional cover;

tearing off the heavy release film in the bonded body to obtain the flexible display panel with optical adhesive and bonding the three-dimensional cover to the flexible display panel through the optical adhesive.

In certain exemplary embodiments, before the flexible display panel is bonded to the heavy release film by optical adhesive to obtain the bonded body, the method further comprises:

obtaining a glued optical assembly, wherein the glued optical assembly is formed by bonding a light release film and the heavy release film through optical adhesive, and the area of the heavy release film, the area of the flexible display panel and the area of the light release film are sequentially reduced;

tearing off the light release film to obtain the heavy release film with optical adhesive.

In certain exemplary embodiments, the conformable tool comprises a conformable table and two fixtures, wherein the carrying surface of the conformable tool is the carrying surface of the conformable table; the carrying surface of the conformable table has a middle region and peripheral regions located at the periphery of the middle region; the carrying surface located at the middle region is a plane; and the carrying surfaces located at the peripheral regions are curved surfaces tangent to the plane;

wherein controlling the fixtures of the conformable tool to adjust the shape of the bonded body comprises:

controlling the two fixtures to clamp two ends of the heavy release film respectively to fix the two ends of the heavy release film to the two fixtures; and controlling the two fixtures to pull the two ends of the heavy release film along a bending direction of the carrying surface, so that the periphery of the bonded body is bent along the curved surface.

In certain exemplary embodiments, the conformable tool further comprises a fixing assembly, and after the bonded body is placed on the carrying surface of the conformable tool, the method further comprises controlling the fixing assembly to fix the bonded body on the carrying surface of the conformable table.

In certain exemplary embodiments, the fixing assembly comprises a first fixing part located in the middle region and second fixing parts located in the peripheral regions, after controlling the fixtures of the conformable tool to adjusts the shape of the bonded body, the method further comprises: controlling the two fixtures to release the heavy release film;

wherein controlling the fixing assembly to fix the bonded body on the carrying surface of the conformable table comprises:

controlling the first fixing part to fix the bonded body after the bonded body is placed on the carrying surface of the conformable tool; and controlling the first fixing part and the second fixing parts to jointly fix the bonded body after controlling the two fixtures to release the heavy release film.

In certain exemplary embodiments, the first fixing part and the second fixing parts each comprises a vacuum adsorption structure.

In certain exemplary embodiments, the first fixing part and the second fixing parts each comprises an electrostatic adsorption structure, and the electrostatic adsorption structure of the first fixing part and the electrostatic adsorption structures of the second fixing parts are insulated from each other.

In certain exemplary embodiments, both the heavy release film and the light release film are rectangular, four first sides of the light release film correspond to four second sides of the heavy release film one-to-one, each first side and the corresponding second side are located at the same side of the optical adhesive, and the maximum distance between each first side and the corresponding second side is 15 mm.

In the second embodiment, there is provided a glued optical assembly, wherein the glued optical assembly is formed by bonding a light release film and a heavy release film through optical adhesive, and the area of the light release film is smaller than that of the heavy release film.

In certain exemplary embodiments, both the heavy release film and the light release film are rectangular, four first sides of the light release film correspond to four second sides of the heavy release film one-to-one, each first side and the corresponding second side are located at the same side of the optical adhesive, and the maximum distance between each first side and the corresponding second side is 15 mm.

The conformable tool comprises two fixtures, a conformable table and a fixing assembly, wherein the fixing assembly is used for fixing an object that needs to be fixed on the carrying surface of the conformable table.

In certain exemplary embodiments, the carrying surface of the conformable table is provided with a middle region and peripheral regions positioned at the periphery of the middle region, the carrying surface positioned at the middle region is a plane, and the carrying surfaces positioned at the peripheral regions are curved surfaces tangent to the plane;

the fixing assembly comprises a first fixing part located in the middle region and second fixing parts located in the peripheral regions.

In certain exemplary embodiments, the first fixing part and the second fixing parts each comprises a vacuum adsorption structure.

In certain exemplary embodiments, the first fixing part and the second fixing parts each comprises an electrostatic adsorption structure, and the electrostatic adsorption structure of the first fixing part and the electrostatic adsorption structures of the second fixing parts are insulated from each other.

It should be understood that the above general description and the following detailed description are merely exemplary and should not limit the present disclosure.

BRIEF DESCRIPTION OF THE DRAWINGS

In order to more clearly explain the technical solution in the embodiments of this disclosure, the following will briefly introduce the drawings that need to be used in the description of the embodiments. Obviously, the drawings in the following description are only some embodiments of this disclosure, and for those of ordinary skill in the art, on the premise of not paying creative efforts, other drawings can also be obtained according to these drawings.

DETAILED DESCRIPTION OF THE DISCLOSURE

Figure 1:
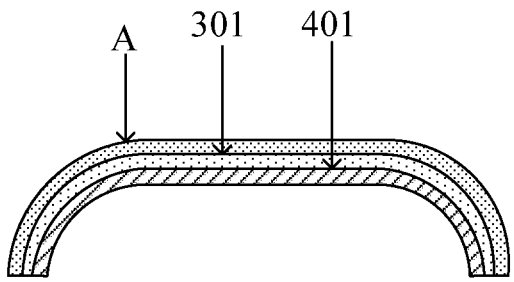
FIG. 1 is a schematic view of a three-dimensional cover bonded to a flexible display panel through optical adhesive according to an embodiment of the present disclosure.

In order to make the purpose, technical solution and advantages of this disclosure clearer, the embodiments of this disclosure will be described in further detail below with reference to the accompanying drawings.

According to an embodiment of the present disclosure, when bonding a three-dimensional cover to a flexible display panel, it needs to be carried out by means of a carrier film, a roller, a glued optical assembly and a conformable tool. The conformable tool comprises two fixtures and a conformable table. The glued optical assembly include optical adhesive, a light release film and a heavy release film bonded to two sides of the optical adhesive. The areas of the carrier film, the light release film, the heavy release film and the optical adhesive are sequentially reduced, and the area of the carrier film is larger than that of the flexible display panel.

When bonding the three-dimensional cover, one method is to firstly place the flexible display panel on the carrier film with sticky surface, and roll on the flexible display panel with the roller, so that the flexible display panel can be bonded to the carrier film. Then, the light release film in the glued optical assembly is torn off, and the optical adhesive bonded with the heavy release film is covered on the flexible display panel, and the roller is used to roll on the heavy release film again, so that the optical adhesive bonded with the heavy release film is bonded to the flexible display panel to form a bonded body. Then, the bonded body is placed on the conformable table (also known as a contouring table or shape-copying table, the size and shape of the outer contour of the carrying part of the conformable table are the same as the size and shape of the inner contour of the three-dimensional cover), so that the carrier film in the bonded body contacts with the conformable table, then the two ends of the heavy release film are clamped and pulled down by two fixtures respectively, and the shape of the bonded body is changed, so that the shape-changed bonded body can be matched with the three-dimensional cover. Finally, the heavy release film is torn off to expose the optical adhesive, and the three-dimensional cover is covered on the optical adhesive, so that the three-dimensional cover is bonded to the flexible display panel through the optical adhesive.

Compared with the existing method of bonding the three-dimensional cover to the flexible display panel by directly pouring liquid adhesive between the three-dimensional cover and the flexible display panel, the bonding method according to the above embodiment of the present disclosure not only has higher bonding efficiency, but also is not easy to damage the flexible display panel.

However, there are still some shortcomings in the above method, for example, the roller is repeatedly used in the process of obtaining the bonded body, and when the roller is used to roll on the flexible display panel, small particles (such as dust) carried by the roller are more easily adhered to the surface of the flexible display panel. In addition, when the roller rolls on the flexible display panel or the heavy release film, the flexible display panel may be damaged due to uneven surface stress under the action of small particles on the surface of the flexible display panel. Therefore, after bonding the three-dimensional cover to the flexible display panel, the flexible display panel is damaged and displays poorly.

In view of this, the inventors have further improved the bonding method between the three-dimensional cover and the flexible display panel.

FIG. 1 is a schematic view of a three-dimensional cover bonded to a flexible display panel by optical adhesive. As shown in FIG. 1, the three-dimensional cover A, the optical adhesive 301 and the flexible display panel 401 are sequentially arranged from top to bottom.

The flexible display panel 401 is a display panel made of flexible material, and the shape of the flexible display panel can be changed. The three-dimensional cover A is a kind of glass with curved surface. The three-dimensional cover A has the characteristics of transparency, high surface hardness and the like. The three-dimensional cover A can be bonded to the flexible display panel 401 by optically clear adhesive (OCA) 301, thereby protecting the flexible display panel 401.

Figure 2:
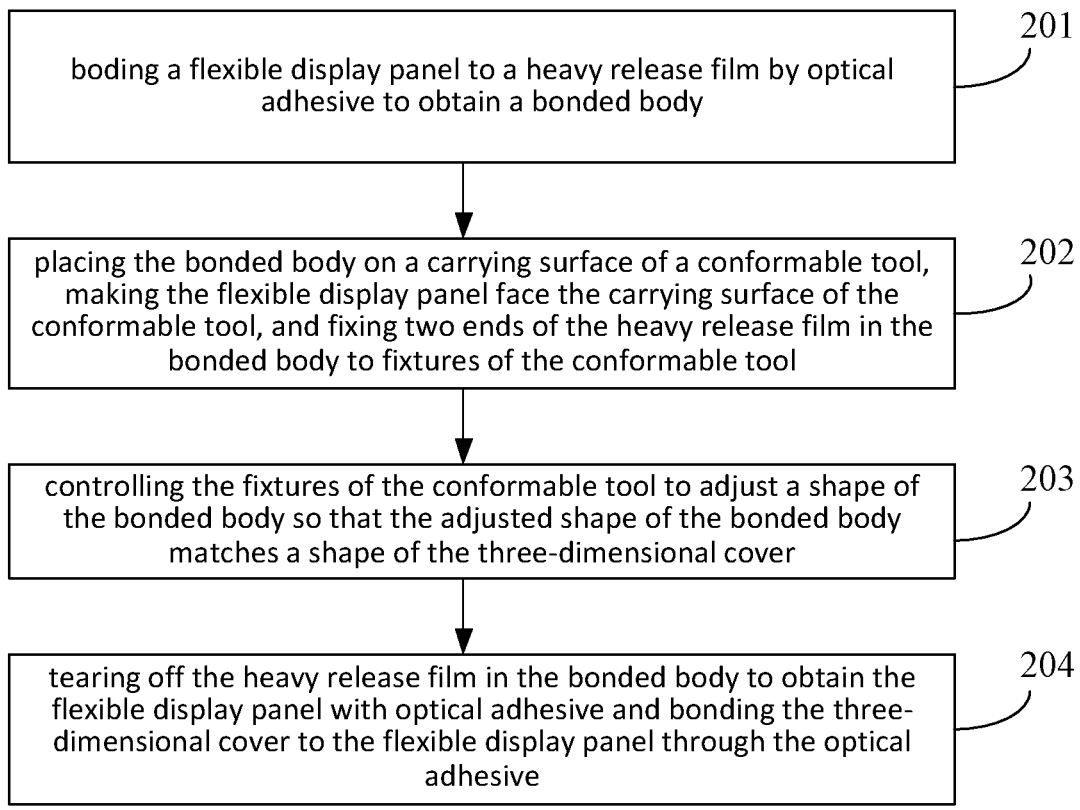
FIG. 2 is a flowchart of a method for bonding a three-dimensional cover according to an embodiment of the present disclosure.

The embodiment of the disclosure provides a method for bonding a three-dimensional cover, which is used for bonding the three-dimensional cover and a flexible display panel. As shown in FIG. 2, the three-dimensional cover bonding method comprises the following steps:

Step 201: boding the flexible display panel to a heavy release film by optical adhesive to obtain a bonded body.

Step 202: placing the bonded body on the carrying surface of a conformable tool, making the flexible display panel face the carrying surface of the conformable tool, and fixing two ends of the heavy release film in the bonded body to fixtures of the conformable tool.

Step 203: controlling the fixtures of the conformable tool to adjust the shape of the bonded body so that the adjusted shape of the bonded body matches the shape of the three-dimensional cover.

Step 204: tearing off the heavy release film in the bonded body to obtain the flexible display panel with optical adhesive and bonding the three-dimensional cover to the flexible display panel through the optical adhesive.

In summary, in the method for bonding the three-dimensional cover provided by the embodiment of the present disclosure, because the carrier film is not used, the flexible display panel is directly bonded with the heavy release film through optical adhesive to obtain the bonded body, so that only one bonding action is performed in the process of obtaining the bonded body, and therefore, the roller is need to be used only once, thus greatly reducing the risk of dust and other small particles carried by the roller adhering to the surface of the flexible display panel. Even though a small number of small particles carried by the roller are adhered to the flexible display panel when using the roller, the flexible display panel will not be damaged. Therefore, it is prevented that the flexible display panel displays poorly due to damage after the three-dimensional cover is bonded to the flexible display panel.

Figure 3:
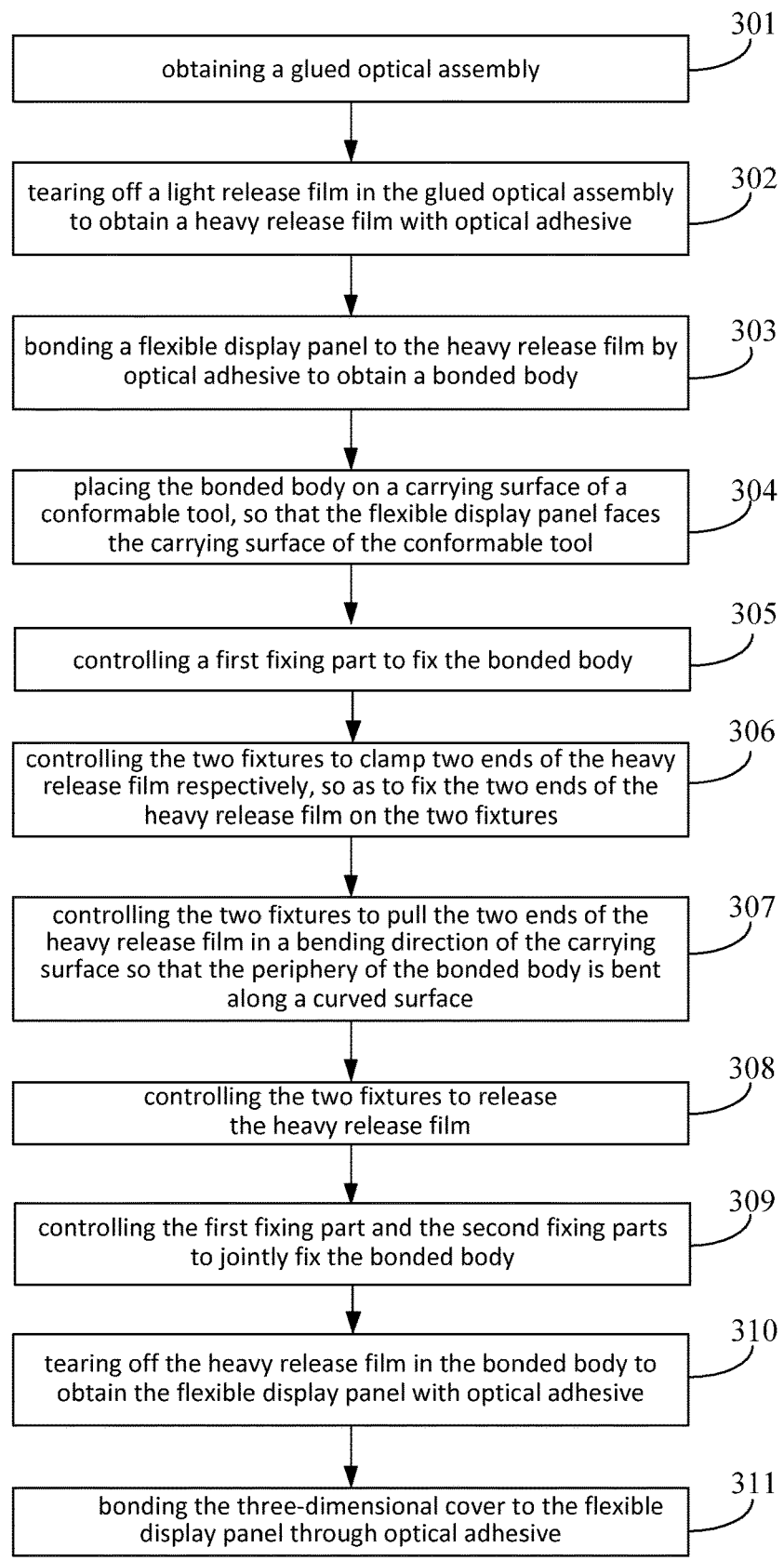
FIG. 3 is a flowchart of another method for bonding a three-dimensional cover according to an embodiment of the present disclosure.

The embodiment of the disclosure also provides another method for bonding a three-dimensional cover, which is used for bonding the three-dimensional cover and a flexible display panel. As shown in FIG. 3, the three-dimensional cover bonding method comprises the following steps:

Step 301: obtaining a glued optical assembly.

The glued optical assembly can be formed by bonding a light release film and a heavy release film by optical adhesive, and the areas of the heavy release film, the light release film and the optical adhesive are sequentially reduced. In certain exemplary embodiments, the light release film is rectangular (the rectangle is surrounded by four first sides), and the heavy release film is also rectangular (the rectangle is surrounded by four second sides), and four first sides of the light release film can correspond to four second sides of the heavy release film one-to-one. Each first side and the corresponding second side are located at the same side of the optical adhesive, and the maximum distance between each first side and the corresponding second side can be 15 mm.

Figure 4:
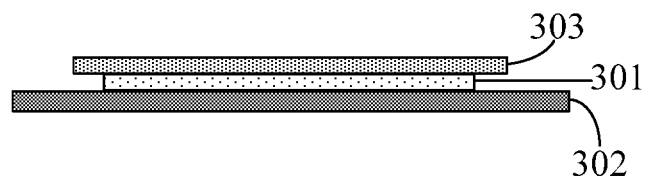
FIG. 4 is a structural schematic view of a glued optical assembly according to an embodiment of the present disclosure.
Figure 5:
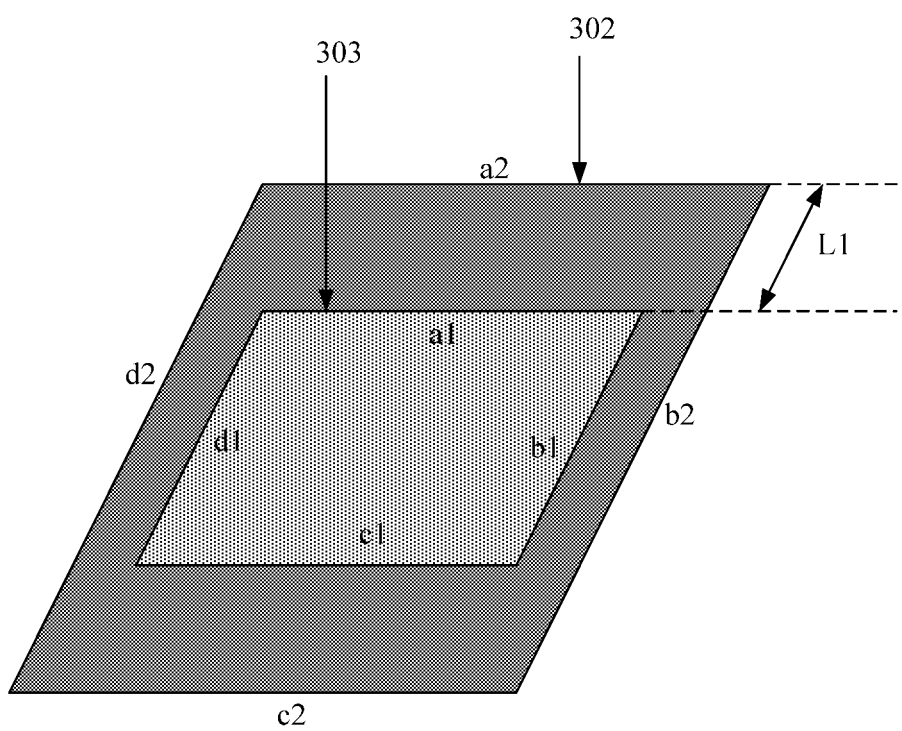
FIG. 5 is a structural schematic view of another glued optical assembly according to an embodiment of the present disclosure.

For example, FIG. 4 is a structural schematic view of a glued optical assembly 30, and two sides of the optical adhesive 301 are bonded with a heavy release film 302 and a light release film 303. Referring to FIG. 5, four first sides of the light release film 303 are a1, b1, c1 and d1, and four second sides of the heavy release film 302 are a2, b2, c2 and d2, respectively. Wherein a1 and a2 correspond to each other and both are located at the same side of the optical adhesive; b1 and b2 correspond to each other and both are located at the same side of the optical adhesive; c1 and c2 correspond to each other and both are located at the same side of the optical adhesive; d1 and d2 correspond to each other and both are located at the same side of the optical adhesive. Among the distances between a1 and a2, b1 and b2, c1 and c2 and d1 and d2, the distances between a1 and a2, c1 and c2 can be equal, and both of them are greater than the distances between b1 and b2, and d1 and d2. For example, the distance L1 between a1 and a2 may be 15 mm.

Step 302: tearing off the light release film in the glued optical assembly to obtain the heavy release film with optical adhesive.

It should be noted that the release film is obtained by coating release agent on a plastic film, and the more the release agent is coated, the easier it is to tear off the release film; and the less the release agent is coated, the harder it is to tear off the release film. For example, the heavy release film is coated with less release agent, so it is harder to tear off the heavy release film. The light release film is coated with more release agent, so it is easier to tear off light release film. In step 302, the light release film coated with more release agent in the glued optical assembly can be torn off.

Figure 6:
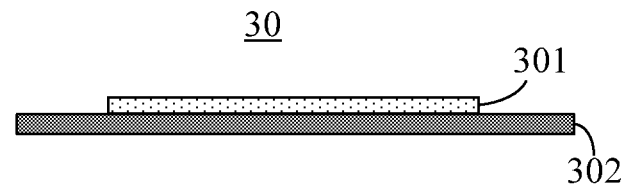
FIG. 6 is a structural schematic view of a glued optical assembly after tearing off a light release film according to an embodiment of the present disclosure.

As shown in FIG. 6, after tearing off the light release film in the glued optical assembly, the heavy release film 302 with the optical adhesive 301 can be obtained, wherein the optical adhesive 301 is bonded to the heavy release film 302.

Step 303: bonding the flexible display panel to the heavy release film by optical adhesive to obtain a bonded body.

Figure 7:
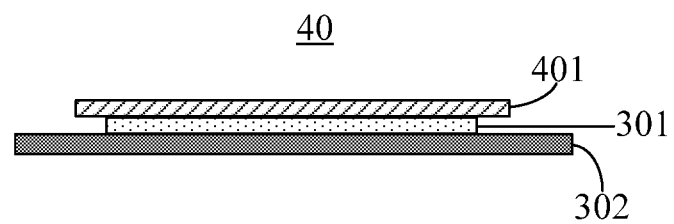
FIG. 7 is a structural schematic view of a bonded body according to an embodiment of the present disclosure.

In certain exemplary embodiments, FIG. 7 is a structural schematic view of the bonded body 40. Referring to FIG. 7, the bonded body 40 includes a flexible display panel 401, optical adhesive 301 and a heavy release film 302, and the areas of the heavy release film 302, the flexible display panel 401 and the optical adhesive 301 are sequentially reduced.

For example, when the flexible display panel 401 is bonded to the heavy release film 302 through the optical adhesive 301, the flexible display panel 401 can be first covered on the heavy release film 302 with the optical adhesive 301 (that is, the glued optical assembly 30 after tearing off the light release film 303), so that the flexible display panel 401 comes into contact with the optical adhesive 301. Then a roller is used to roll on the flexible display panel 401, so that the flexible display panel 401 is in close contact with the optical adhesive 301, and thus the flexible display panel 401 is bonded with the heavy release film 302 through the optical adhesive 301 to form a bonded body 40.

Step 304: placing the bonded body on the carrying surface of the conformable tool, so that the flexible display panel faces the carrying surface of the conformable tool.

Figure 8:
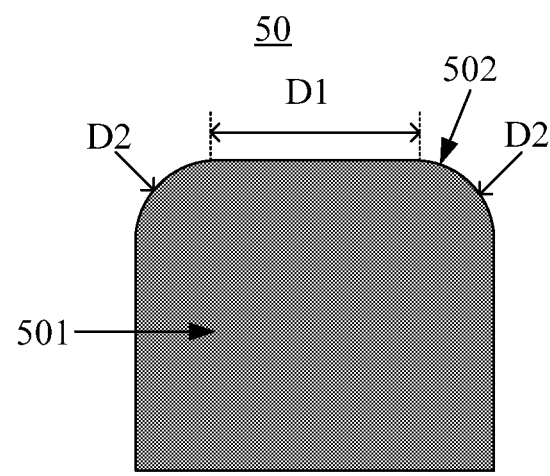
FIG. 8 is a structural schematic view of a conformable tool according to an embodiment of the present disclosure.

Alternatively, as shown in FIG. 8, the conformable tool 50 may include a conformable table 501 and two fixtures (not shown in FIG. 8). The carrying surface of the conformable tool 50 is the carrying surface 502 of the conformable table 501. The carrying surface 502 of the conformable table 501 may have a middle region D1 and peripheral regions D2 located at the periphery of the middle region D1, the carrying surface located at the middle region D1 may be a plane, and the carrying surfaces located at the peripheral regions D2 may be curved surfaces tangent to the plane. It should be noted that the shape of the carrying surface 502 is matched with that of the three-dimensional cover.

Alternatively, the two fixtures in the conformable tool 50 can have a variety of settings. For example, the two fixtures can also be independent of the conformable table 501. Alternatively, two fixtures can be connected to the conformable table 501 and located at two sides of the conformable table 501 respectively, and when two fixtures need to be used, the two fixtures can extend from two sides of the conformable table 501. The conformable tool 50 may also include two pairs of fixtures, one pair of which is located at the front and rear sides of the conformable table 501, and the other pair of fixtures is located at the left and right sides of the conformable table 501. Of course, more fixtures surrounding the conformable table 501 may also be included in the conformable tool 50. When there are only two fixtures in the conformable tool 50, in practical application, after two fixtures are controlled to pull two ends of the heavy release film in one direction to be bonded with the conformable table 501, the two fixtures are removed from the heavy release film, and the pulling is continued by changing to another direction, that is, using the two fixtures, two ends of the heavy release film in another direction are pulled to be further bonded with the conformable table.

Figure 9:
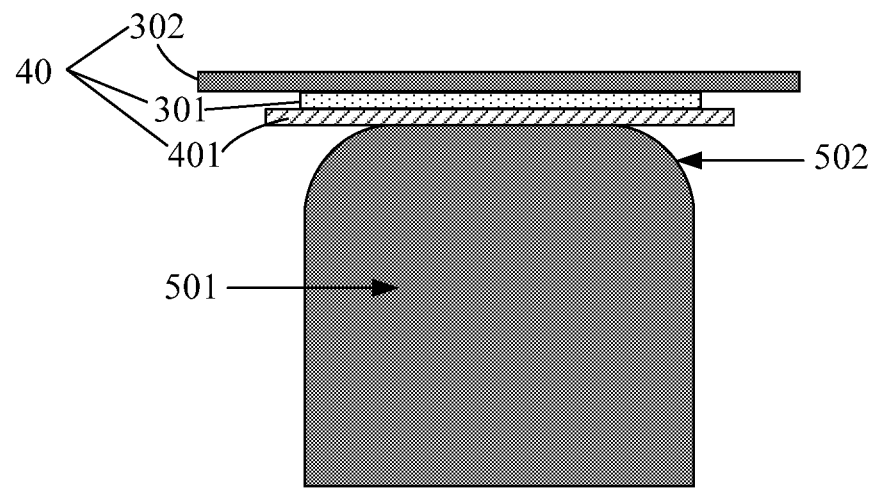
FIG. 9 is a schematic view of placing a bonded body on a carrying surface of a conformable tool according to an embodiment of the present disclosure.

FIG. 9 is a structural schematic view of placing the bonded body 40 on the carrying surface 502 of the conformable tool 50. As shown in FIG. 9, after placing the bonded body 40 on the carrying surface 502 of the conformable tool, the flexible display panel 401 faces the carrying surface 502.

Step 305: controlling the first fixing part to fix the bonded body.

Figure 10:
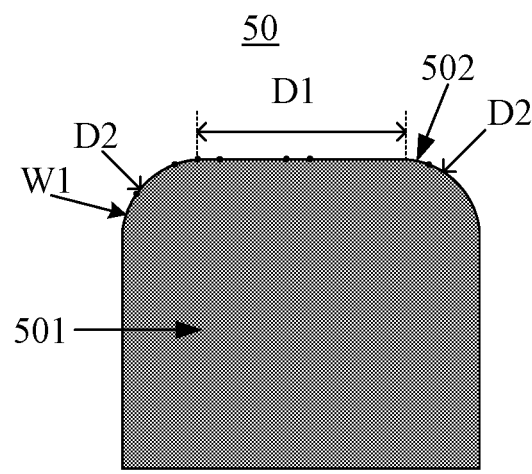
FIG. 10 is a structural schematic view of another conformable tool according to an embodiment of the present disclosure.

As shown in FIG. 10, on the basis of FIG. 8, the conformable tool 50 may further include a fixing assembly. In certain exemplary embodiments, the fixing assembly may include a first fixing part located in the middle region D1 and second fixing parts located in the peripheral regions D2. The embodiments of the first fixing part and the second fixing parts are various, and two of them will be exemplified in the embodiments of this disclosure:

In the first embodiment, as shown in FIG. 10, the first fixing part and the second fixing parts may each include a vacuum adsorption structure, and the vacuum adsorption structure of the first fixing part and the vacuum adsorption structures of the second fixing parts are independent of each other. For example, each vacuum adsorption structure may include a plurality of vacuum adsorption holes W1 arranged in the carrying surface and a vacuum adsorber (not shown in FIG. 10) communicated with the plurality of vacuum adsorption holes W1, and the vacuum adsorber in each vacuum adsorption structure can adsorb the bonded body 40 placed on the carrying surface 502 through the plurality of vacuum adsorption holes W1 in the vacuum adsorption structure.

For example, the vacuum adsorber can be communicated with the vacuum adsorption holes through pipelines in the conformable table 501. The vacuum adsorber can pump air at the vacuum adsorption holes through the pipelines to reduce the air between the bonded body 40 and the carrying surface 502, thus fixing the bonded body 40 on the carrying surface 502 of the conformable table 501.

Figure 11:
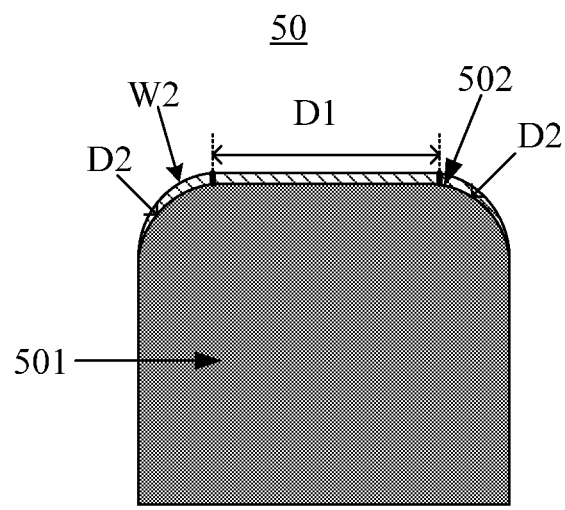
FIG. 11 is a structural schematic view of another conformable tool according to an embodiment of the present disclosure.

In the second embodiment, as shown in FIG. 11, the first fixing part and the second fixing parts may each include an electrostatic adsorption structure, and the electrostatic adsorption structure of the first fixing part and the electrostatic adsorption structures of the second fixing parts are insulated from each other. For example, each electrostatic adsorption structure may include an electrostatic adsorption layer W2 disposed on the carrying surface and an electrostatic applicator (not shown in FIG. 12) connected with the electrostatic adsorption layer W2, and the electrostatic applicator can apply static electricity to the connected electrostatic adsorption layer W2, so that the electrostatic adsorption layer adsorbs the bonded body placed on the carrying surface under the action of the static electricity It should be noted that when the first fixing part and the second fixing parts each comprises an electrostatic adsorption structure, in step 304, the bonded body can be placed on the electrostatic adsorption layer on the carrying surface of the conformable tool, so that the flexible display panel faces the carrying surface of the conformable tool.

When step 305 is executed, the first fixing part can be controlled to fix the bonded body 40 on the carrying surface 502 of the conformable tool 50. For example, when the first fixing part comprises a vacuum adsorption structure, it is possible to control the vacuum adsorber in the first fixing part to adsorb the bonded body placed on the carrying surface through the vacuum adsorption holes in the first fixing part. When the first fixing part comprises an electrostatic adsorption structure, the electrostatic applicator in the first fixing part can be controlled to apply static electricity to the electrostatic adsorption layer in the first fixing part, so that the electrostatic adsorption layer in the first fixing part adsorbs the bonded body placed on the carrying surface under the action of the static electricity.

Step 306: controlling the two fixtures to clamp two ends of the heavy release film respectively, so as to fix the two ends of the heavy release film to the two fixtures.

Figure 12:
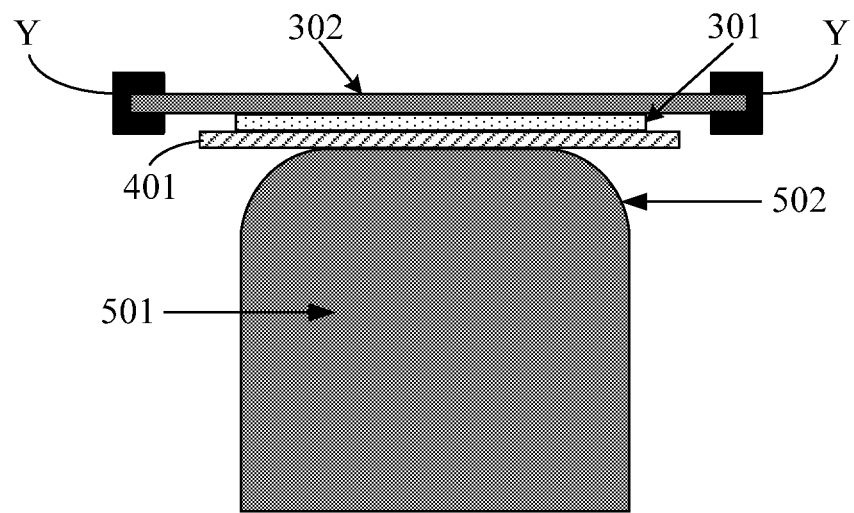
FIG. 12 is a schematic view of controlling two fixtures to respectively clamp two ends of the heavy release film according to an embodiment of the present disclosure.

As shown in FIG. 12, in step 305, the two fixtures Y can be controlled to clamp the two ends of the heavy release film 302 respectively, so that the two fixtures Y in the conformable tool 50 fix the two ends of the heavy release film 302, so as to realize the fixation of the two ends of the heavy release film 302 on the conformable tool 50. For example, referring to FIGS. 12 and 5, two fixtures Y can be controlled to clamp the two ends where the second sides a2 and c2 (two opposite second sides) in the heavy release film 302 are located, respectively. It should be noted that the fixing assembly in the conformable tool is not shown in FIG. 12.

In practice, when fixing the two ends of the heavy release film 302 on the fixtures of the conformable tool 50, two tools with adsorption function can also be used to adsorb the two ends of the heavy release film 302.

Step 307: controlling the two fixtures to pull the two ends of the heavy release film along the bending direction of the carrying surface (downward pulling in FIG. 12), so that the periphery of the bonded body is bent along the curved surface.

Figure 13:
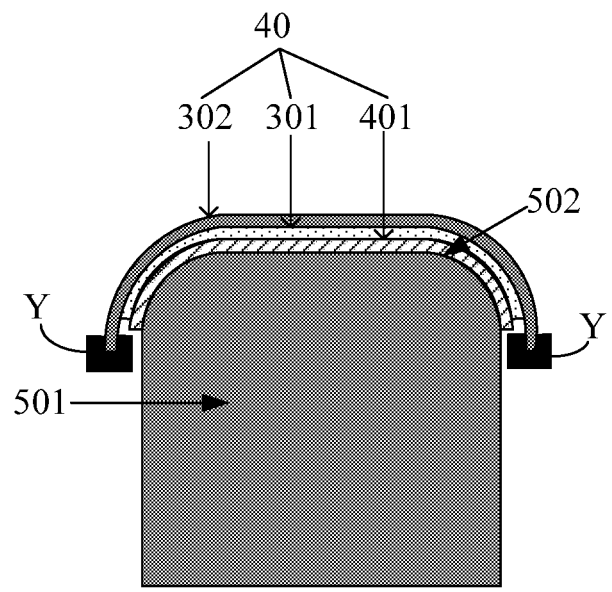
FIG. 13 is a structural schematic view of a bonded body with its periphery bent along a curved surface according to an embodiment of the present disclosure.

FIG. 13 is a structural schematic view of the periphery of the bonded body bent along the curved surface. As shown in FIG. 13, after the two ends of the heavy release film 302 are fixed to the two fixtures Y, as the two fixtures Y pull the heavy release film 302 along the bending direction of the carrying surface 502, the flexible display panel 401 and the optical adhesive 301 also change shapes with the heavy release film 302, so that the bonded body 40 is adjusted to the same shape as the surface of the carrying surface 502 (that is, the shape matched with the three-dimensional cover), so that the adjusted shape of the bonded body 40 can match the three-dimensional cover.

In addition, because the area of the heavy release film 302 in the glued optical assembly 30 in the embodiment of the present disclosure is relatively large, when controlling the fixtures of the conformable tool 50 to adjust the shape of the bonded body 40, the fixtures Y can clamp the heavy release film 302 easily, thereby adjusting the shape of the bonded body 40.

In the embodiment of the present disclosure, before the flexible display panel 401 is changed in shape by pulling the heavy release film 302 with the fixtures Y (as in step 305), the bonded body 40 is also fixed on the carrying surface 502 by the first fixing part in the fixing assembly, thus preventing the bonded body 40 from falling off from the conformable table 501 when pulling the heavy release film 302 in step 307, and preventing the adjusted shape of the bonded body 40 not effectively matching the three-dimensional cover due to the left-right movement of the bonded body 40 when pulling the heavy release film 302.

Step 308: controlling the two fixtures to release the heavy release film.

Step 309: controlling the first fixing part and the second fixing parts to jointly fix the bonded body.

After the two fixtures are controlled to release the heavy release film, the first fixing part and the second fixing parts can be controlled to jointly fix the bonded body on the carrying surface of the conformable tool.

For example, when the first fixing part and the second fixing parts each comprises a vacuum adsorption structure, the vacuum adsorbers in the first fixing part and the second fixing parts can be controlled to respectively adsorb the bonded body placed on the carrying surface through the vacuum adsorption holes in the fixing parts where each vacuum adsorber is located.

When the first fixing part and the second fixing parts each comprises an electrostatic adsorption structure, the electrostatic applicators in the first fixing part and the second fixing parts can be controlled to respectively apply static electricity to the electrostatic adsorption layers in the fixing parts where each electrostatic applicator is located, so that the electrostatic adsorption layers in the first fixing part and the second fixing parts adsorb the bonded body placed on the carrying surface under the action of static electricity.

Step 310: tearing off the heavy release film in the bonded body to obtain the flexible display panel with optical adhesive.

Figure 14:
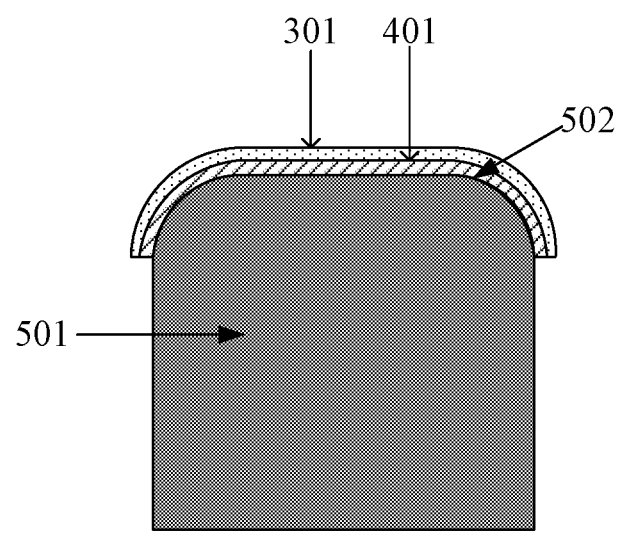
FIG. 14 is a structural schematic view of a bonded body after tearing off the heavy release film according to an embodiment of the present disclosure.

As shown in FIG. 14, after tearing off the heavy release film in the bonded body, the flexible display panel 401 and the optical adhesive 301 with shapes matching the three-dimensional cover can be obtained.

It should be noted that after the fixtures Y release the heavy release film 302 in step 308, the flexible display panel 401 can be effectively fixed on the conformable table because the first fixing part and the second fixing parts are jointly used to fix the conformable body 40 in step 309. Therefore, the heavy release film 302 in the bonded body can be easily torn off in step 310. At the same time, using the first fixing part and the second fixing parts to jointly fix the bonded body 40 can also effectively prevent the flexible display panel 401 from falling off from the conformable table 501 when tearing off the heavy release film 302.

Step 311: bonding the three-dimensional cover to the flexible display panel through optical adhesive.

Figure 15:
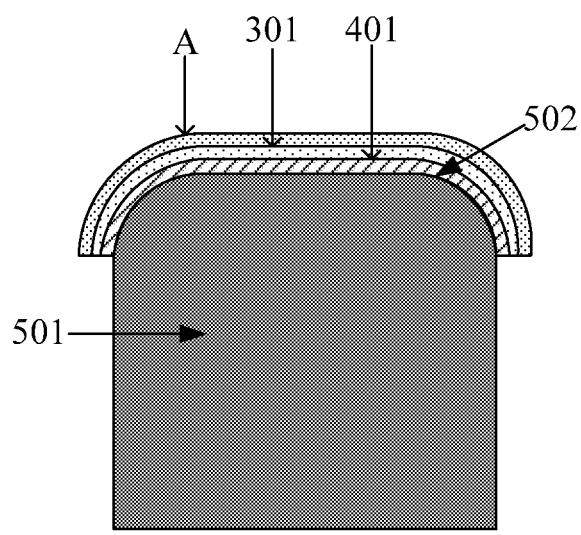
FIG. 15 is a schematic view of bonding a three-dimensional cover to a flexible display panel through optical adhesive according to an embodiment of the present disclosure.

As shown in FIG. 15, in step 311, the three-dimensional cover A matched with the carrying surface 502 can be directly covered on the optical adhesive 301, so that the three-dimensional cover A can be bonded to the flexible display panel 401 through the optical adhesive 301, thus obtaining the bonded flexible display panel 401 and the three-dimensional cover A.

In the related art of using the carrier film for bonding, the carrier film will lose its stickiness under the irradiation of ultraviolet (UV). After bonding the three-dimensional cover to the flexible display panel by the bonding method using the carrier film, it is necessary to tear off the carrier film. At this time, the carrier film, the flexible display panel, the optical adhesive and the three-dimensional cover are integrated. When tearing off the carrier film, it is necessary to fix the whole body by a fixing device and use UV irradiation to make the carrier film lose its stickiness and tear it away from the flexible display panel. In the process of UV irradiation of the carrier film, if the distribution of UV light on the carrier film is not uniform, there will be some areas on the carrier film that are not irradiated by UV, resulting in some areas on the carrier film still have stickiness after UV irradiation of the carrier film, and the flexible display panel will deform due to the interaction between tearing force and adhesive force in the process of tearing off the carrier film, and even break away from the fixing device, resulting in the flexible display panel falling and being damaged.

However, the method for bonding the three-dimensional cover provided by the embodiment of the present disclosure does not use the carrier film, therefore, it is unnecessary to carry out the step of tearing off the carrier film, and thus the situation that the flexible display panel deforms or even falls and damages during the process of tearing off the carrier film can be avoided. And because the carrier film is not used in the three-dimensional cover bonding method provided by the embodiment of the present disclosure, the cost of the three-dimensional cover bonding process is reduced.

It should be noted that the sequence of steps in the method embodiment provided in the embodiment of the present disclosure can be adjusted appropriately, and steps can be correspondingly increased or decreased according to the situation. For example, steps 305 and 309 may not be executed. Any method that can be easily thought of by those familiar with the technical field within the technical scope of this disclosure should be covered by the protection scope of this disclosure, so it will not be repeated here.

In summary, in the method for bonding the three-dimensional cover provided by the embodiment of the present disclosure, because the carrier film is not used, and the flexible display panel is directly bonded with the heavy release film through optical adhesive to obtain the bonded body, so that only one bonding action is performed in the process of obtaining the bonded body, and therefore, the roller needs to be used only once, thus greatly reducing the risk of small particles carried by the roller adhering to the flexible display panel when the roller is used. Even though a small number of small particles carried by the roller are still bonded to the flexible display panel when using the roller, the flexible display panel will not be damaged. Therefore, it is prevented that the flexible display panel displays poorly due to damage after the three-dimensional cover is bonded to the flexible display panel.

The embodiment of the present disclosure also provides a glued optical assembly, referring to FIG. 4. The glued optical assembly can be formed by bonding a light release film and a heavy release film by optical adhesive, and the areas of the heavy release film, the light release film and the optical adhesive are sequentially reduced.

In certain exemplary embodiments, the light release film is rectangular (the rectangle is surrounded by four first sides), and the heavy release film is also rectangular (the rectangle is surrounded by four second sides), and the four first sides of the light release film can correspond to the four second sides of the heavy release film one-to-one. Each first side and the corresponding second side are located at the same side of the optical adhesive, and the maximum distance between each first side and the corresponding second side can be 15 mm.

For example, FIG. 4 is a structural schematic view of the glued optical assembly 30, and two sides of the optical adhesive 301 are bonded with a heavy release film 302 and a light release film 303. Referring to FIG. 5, the four first sides of the light release film 303 are a1, b1, c1 and d1, and the four second sides of the heavy release film 302 are a2, b2, c2 and d2, respectively. Wherein a1 and a2 correspond to each other and are both located at the same side of the optical adhesive; b1 and b2 correspond to each other and are both located at the same side of the optical adhesive; c1 and c2 correspond to each other and are both located at the same side of the optical adhesive; d1 and d2 correspond to each other and are both located at the same side of the optical adhesive. Among the distances between a1 and a2, b1 and b2, c1 and c2 and d1 and d2, the distances between a1 and a2, c1 and c2 can be equal, and both of them are greater than the distances between b1 and b2, and d1 and d2. For example, the distance L1 between a1 and a2 may be 15 mm.

Please refer to FIG. 8 for the conformable tool of the embodiment of the present disclosure. The conformable tool 50 comprises two fixtures (not shown in FIG. 8), a conformable table 501 and a fixing assembly (not shown in FIG. 8), wherein the fixing assembly is used for fixing an object on the carrying surface 502 of the conformable table 501.

The carrying surface 502 of the conformable table 501 has a middle region D1 and two peripheral regions D2 located at the periphery of the middle region D1, wherein the carrying surface located in the middle region D1 is a plane, and the carrying iii surfaces located in the peripheral regions D2 are curved surfaces tangent to the plane.

In certain exemplary embodiments, the fixing assembly may include a first fixing part located in the middle region D1 and second fixing parts located in the peripheral regions D2. For example, the embodiments of the first fixing part and the second fixing parts are various, and two of them will be exemplified in the embodiments of this disclosure:

In the first embodiment, as shown in FIG. 10, the first fixing part and the second fixing parts may each include a vacuum adsorption structure, and the vacuum adsorption structure of the first fixing part and the vacuum adsorption structures of the second fixing parts are independent of each other. For example, each vacuum adsorption structure may include a plurality of vacuum adsorption holes W1 arranged on the carrying surface and a vacuum adsorber (not shown in FIG. 10) communicated with the plurality of vacuum adsorption holes W1, and the vacuum adsorber in each vacuum adsorption structure can adsorb the bonded body 40 placed on the carrying surface 502 through the plurality of vacuum adsorption holes W1 in the vacuum adsorption structure.

For example, the vacuum adsorber can be communicated with the vacuum adsorption holes through pipelines in the conformable table 501. The vacuum adsorber can pump air at the vacuum adsorption holes through the pipelines to reduce the air between the bonded body 40 and the carrying surface 502, thus fixing the bonded body 40 on the carrying surface 502 of the conformable table 501.

In the second embodiment, as shown in FIG. 11, the first fixing part and the second fixing parts may each include an electrostatic adsorption structure, and the electrostatic adsorption structure of the first fixing part and the electrostatic adsorption structures of the second fixing parts are insulated from each other. For example, each electrostatic adsorption structure may include an electrostatic adsorption layer W2 disposed on a carrying surface and an electrostatic applicator (not shown in FIG. 12) connected with the electrostatic adsorption layer W2, and the electrostatic applicator can apply static electricity to the connected electrostatic adsorption layer W2, so that the electrostatic adsorption layer adsorbs the bonded body placed on the carrying surface under the action of the static electricity.

It should be noted that the method embodiments provided by the embodiments of this disclosure can be mutually referenced and combined with glued optical assembly embodiments and conformable tool embodiments, and the embodiments of this disclosure are not limited thereto.

The above description is only alternative embodiments of this disclosure and is not intended to limit this disclosure. Any modifications, equivalent substitutions, improvements and the like made within the spirit and principles of this disclosure shall be included within the scope of protection of this disclosure.

The invention claimed is:

1. A method for bonding a three-dimensional cover comprising the following steps in sequence:
   (i) covering a flexible display panel on a heavy release film with an optical adhesive, so that the flexible display panel comes into contact with the optical adhesive;
   (ii) rolling a roller on the flexible display panel, so that the flexible display panel is in close contact with the optical adhesive, and thus the flexible display panel is bonded with the heavy release film through the optical adhesive to obtain a bonded body;
   (iii) placing the bonded body on a carrying surface of a conformable tool, making the flexible display panel face the carrying surface of the conformable tool, and fixing two ends of the heavy release film of the bonded body to fixtures of the conformable tool;
   (iv) controlling the fixtures of the conformable tool to adjust a shape of the bonded body so that an adjusted shape of the bonded body matches a shape of the three-dimensional cover; and (v) tearing off the heavy release film of the bonded body to obtain the flexible display panel with optical adhesive and bonding the three-dimensional cover to the flexible display panel using the optical adhesive, wherein the conformable tool comprises a conformable table and two pairs of fixtures, one pair of the fixtures are located at front and rear sides of the conformable table to adjust a shape of the bonded body at the front and rear sides of the conformable table, and the other pair of the fixtures are located at left and right sides of the conformable table to adjust a shape of the bonded body at the left and right sides of the conformable table.

2. The method according to claim 1, wherein before covering the flexible display panel on the heavy release film with the optical adhesive, the method further comprises:

obtaining a glued optical assembly, wherein the glued optical assembly is formed by bonding a light release film and the heavy release film with optical adhesive, and wherein a total area of the heavy release film, a total area of the flexible display panel and a total area of the light release film are each smaller than the last; and tearing off the light release film to obtain the heavy release film coated in optical adhesive.

3. The method according to claim 1, wherein a carrying surface of the conformable table is the carrying surface of the conformable tool;

wherein the carrying surface of the conformable table comprises a middle region and peripheral regions located at a periphery of the middle region;

wherein the carrying surface at the middle region is a plane and the carrying surfaces at the peripheral regions are curved surfaces tangent to the plane;

wherein controlling the fixtures of the conformable tool to adjust the shape of the bonded body comprises:

controlling two fixtures of each pair of fixtures to clamp two ends of the heavy release film respectively to fix the two ends of the heavy release film to the two fixtures; and controlling the two fixtures to pull the two ends of the heavy release film along a bending direction of the carrying surface, so that a periphery of the bonded body is bent along the curved surfaces of the carrying surface.

4. The method according to claim 3, wherein the conformable tool further comprises a fixing assembly, and after the bonded body is placed on the carrying surface of the conformable tool, the method further comprises:

controlling the fixing assembly to fix the bonded body on the carrying surface of the conformable tool.

5. The method according to claim 4, wherein the fixing assembly comprises a first fixing part located in the middle region of the carrying surface and a plurality of second fixing parts located in the peripheral regions of the carrying surface, wherein, after controlling the fixtures of the conformable tool to adjust the shape of the bonded body, the method further comprises controlling the two fixtures to release the heavy release film; and further wherein controlling the fixing assembly to fix the bonded body on the carrying surface of the conformable table comprises:

controlling the first fixing part to fix the bonded body after the bonded body is placed on the carrying surface of the conformable tool; and controlling the first fixing part and the plurality of second fixing parts to jointly fix the bonded body after controlling the two fixtures to release the heavy release film.

6. The method according to claim 5, wherein the first fixing part and the second fixing parts each comprise a vacuum adsorption structure.

7. The method according to claim 5, wherein the first fixing part and the second fixing parts each comprise an electrostatic adsorption structure, and the electrostatic adsorption structure of the first fixing part and the electrostatic adsorption structures of the plurality of second fixing parts are insulated from each other.

8. The method according to claim 2, wherein the heavy release film and the light release film are both rectangular, wherein four first sides of the light release film correspond to four second sides of the heavy release film one-to-one, wherein each first side and the corresponding second side are located at a same side of the optical assembly, and a maximum distance between each first side and the corresponding second side is 15 mm.

9. The method according to claim 1, wherein the conformable tool further comprises a fixing assembly, wherein the fixing assembly is used for fixing an object that needs to be fixed on the carrying surface of the conformable tool and a carrying surface of the conformable table is the same as the carrying surface of the conformable tool.

10. The method according to claim 9, wherein, the carrying surface of the conformable table is provided with a middle region and peripheral regions positioned at the periphery of the middle region, wherein the carrying surface positioned at the middle region is a plane, and the carrying surfaces positioned at the peripheral regions are curved surfaces tangent to the plane; and the fixing assembly comprises a first fixing part located in the middle region and a plurality of second fixing parts located in the peripheral regions.

11. The method according to claim 10, wherein the first fixing part and the second fixing parts each comprise a vacuum adsorption structure.

12. The method according to claim 10, wherein the first fixing part and the second fixing parts each comprise an electrostatic adsorption structure, and the electrostatic adsorption structure of the first fixing part and the electrostatic adsorption structures of the second fixing parts are insulated from each other.

* * * * *